(12) United States Patent
Aronsson et al.

(10) Patent No.: US 7,386,481 B2
(45) Date of Patent: Jun. 10, 2008

(54) METHOD FOR DELIVERING AND CHARGING FOR SERVICES IN A TELECOMMUNICATIONS NETWORK

(75) Inventors: Hannu Aronsson, Helsinki (FI); Simo Sateri, Espoo (FI)

(73) Assignee: Portalify Oy, Espoo (FI)

( * ) Notice: Subject to any disclaimer, the term of this patent is extended or adjusted under 35 U.S.C. 154(b) by 779 days.

(21) Appl. No.: 10/492,743

(22) PCT Filed: Oct. 21, 2002

(86) PCT No.: PCT/FI02/00815

§ 371 (c)(1),
(2), (4) Date: Apr. 15, 2004

(87) PCT Pub. No.: WO03/036529

PCT Pub. Date: May 1, 2003

(65) Prior Publication Data

US 2004/0243475 A1    Dec. 2, 2004

(51) Int. Cl.
*G06Q 3/00* (2006.01)
(52) U.S. Cl. .............................. 705/26; 705/40; 705/65
(58) Field of Classification Search ................. 705/26, 705/27, 40; 713/156
See application file for complete search history.

(56) References Cited

U.S. PATENT DOCUMENTS

| | | | |
|---|---|---|---|
| 5,930,777 A * | 7/1999 | Barber | 705/40 |
| 6,047,268 A | 4/2000 | Bartoli et al. | |
| 6,157,917 A | 12/2000 | Barber | |
| 6,628,766 B1 * | 9/2003 | Hollis et al. | 379/114.2 |
| 6,944,776 B1 * | 9/2005 | Lockhart et al. | 705/59 |
| 7,013,296 B1 * | 3/2006 | Yemini et al. | 705/77 |
| 2001/0013020 A1 * | 8/2001 | Yoshida et al. | 705/50 |
| 2004/0139204 A1 * | 7/2004 | Ergezinger et al. | 709/229 |

FOREIGN PATENT DOCUMENTS

| | | | |
|---|---|---|---|
| EP | 913789 A2 * | 5/1999 | |
| WO | WO99/07121 | 2/1999 | |
| WO | WO 01/45008 | 6/2001 | |

OTHER PUBLICATIONS

Author unknown, "Netegrity Addresses Web Services Security With Release of TransactionMinder," PR Newswire, New York, Oct. 15, 2002.*

* cited by examiner

*Primary Examiner*—Yogesh C. Garg
*Assistant Examiner*—Amee A. Shah
(74) *Attorney, Agent, or Firm*—Rolf Fasth; Fasth Law Offices

(57) ABSTRACT

The method is for delivering and charging for services. The network has one or more user terminals with a browser for requesting services from the service provider and has a connection to a management server. The service provider provides services to the user terminals. The management server has a connection to a database managed by the management server. The database includes information about valid users. The management server communicates with service users in order to process payments for services to be used.

20 Claims, 4 Drawing Sheets

METHOD FOR DELIVERING AND CHARGING FOR SERVICES IN A TELECOMMUNICATIONS NETWORK

PRIOR APPLICATIONS

This is a US national phase patent application that claims priority from PCT/FI02/00815, filed 21 Oct. 2002, that claims priority from Finnish Patent Application No. 012044, filed 22 Oct. 2001.

TECHNICAL FIELD

The invention is concerned with a method and a network in a telecommunication network for delivering and charging for services.

BACKGROUND ART

An internetwork is a collection of individual networks, connected by computers that function as a single large network. The internet is an example of an internetworked wide area network. This world wide network can be used for communication and information delivery and information retrieval. The open and common internet has grown phenomenally during the last few years and a large number of services for large and small user groups has developed in the internet. The use of these services is either free of charge, supported by third parties, e.g. advertisers, or in alternative, you have to register yourself in advance to be able to use the services. Usually, you are provided with a password that enables you to use the services for which you have been registered.

The interconnected computers exchange information by using different services such as electronic mail and the world wide web www. Each service of the www is identifiable by a Uniform Resource Locator (URL). To view a specific web page, a client computer system specifies the URL for that web page in a request, e.g. in the form of a Hyper Text Transfer Protocol (HTTP) request. The request is forwarded to the web server that holds the web page in question. When that web server receives the request, it sends the web page to the client's computer system. The client's computer system receives the web page using a browser. A browser is a special purpose application program that effects the requesting of web pages and the displaying of web pages.

Currently, web pages are typically defined using Hyper Text Markup Language (HTML). HTML defines how a web page is to be displayed. Thus, a browser displays a web page as defined by the HTML document. The HTML document controls the displaying of text, graphics and other features. A HTML document may also contain URLs or other web pages available on that server computer system or other server computer systems.

Many web servers have been developed through which vendors can advertise and sell products and services that are delivered electronically. When a user has selected the services to be delivered, the server computer system asks the user for information to complete the ordering. The order information may include the clients name, credit card number and address for the order. The server computer system then typically confirms the order by sending a confirming web page to the client's computer system.

There are some known methods for charging of these services. Either you pay for each time you use the service or then you have a monthly amount to pay.

U.S. Pat. No. 5,960,411 describes a system where the user can click on a button on a shop website which will complete an order by using a previously given mailing address and payment information. Other user interaction to complete the payments is not required. The patent does net, however, describe any solutions for charging for new users or one-time payments.

There is obviously a need for more flexible charging systems, so that also the charging of new users would be possible. Services should also be able to be delivered in a way making charging of everyone using the services possible.

In an earlier solution of the applicant, FI20011134, in a method for delivering a service in a communication network, the service provider co-operates with a bank server, to which payments can be made.

The bank server has software with which the user registers himself and with which the accounts of the users are handled. In practice, this is done via the bank's web site.

OBJECT OF THE INVENTION

The object of this invention is to develop methods and systems for delivering and charging for services in a flexible way.

Another object is to be able to charge for services in real time without the need to special software with respect to payments.

SUMMARY OF THE INVENTION

The method of the invention is intended for delivering and charging for services in a telecommunication network, comprising at least one user terminal, a browser, a service provider and a management server. In the steps of the method, the user terminal first sends a request for a service to the service provider. The service provider then checks if the user has the right to the requested service. If no such right exists, the user is redirected to the management server for obtaining a right to the service. Thereafter, the user terminal receives instructions from the management server and having followed them, obtains a right to the service. The management server then redirects the user terminal to the service provider, whereafter the service provider again checks the user's right to the service. The service is delivered to the user terminal by the service provider after confirming of the user's right to the service.

The invention is also concerned with a telecommunication network, which can perform the method of the invention. The network delivers and charges for services and comprising one or more user terminals with a browser for requesting services from the service provider and has a connection to a management server.

Preferable embodiments of the invention are presented in the following.

The service provider provides services to the user terminals and the management server has a connection to a data base managed by the management server with information of valid users and the management server communicates with service users in order to process payments for services to be used. The data base includes a list of valid users and other user information, such as validity times for using the service, user equipment information, and connection information.

The services provided by the service provider are usually web pages with a check function for checking the validity of users requesting for services by means of a validation token included in the request for the services. The users request the web page by means of an address to the web page, such as an URL address.

The service provider checks the right to the service by means of a validation token included in the request if the user has the right to the service. If a validation token exists, the check includes the steps of checking the integrity of the validation token, the validation time, the browser program and/or IP address. If no validation token exists, the user is redirected to the management server for obtaining a validation token giving the right to the service.

In connection with the redirecting, the service provider sends a content ID to the browser to be able to identify the service later, which the browser forward to the management server. The browser also sends a cookie to the management server, containing user information, if the user is not a new user.

The instructions from the management server to the user terminal includes a request to pay for the service by referring to a unique code connecting the user to the requested service described by the content ID given by the service provider earlier. The instructions from the management server to the user terminal also include a user cookie to be used the next time when a service is requested.

The payment is performed by sending a SMS payment message or by calling to a service number.

The payment can be a one-time payment or a subscription.

The payment message includes said unique code connecting the specific user to the requested service. By means of this unique code, the management server can connect the payment to the right user and content ID.

Different alternatives exist after that the user has been redirected to the management server from the service provider when the token check failed.

The connection between the browser and the management server needs to be kept active so that the browser can be automatically redirected to the content with the token after payment has been made.

There are several possible solutions to keep the connection active, e.g.:

A web page containing a frame-set, which has one frame (a portion of the visible web page) containing instructions for paying and another frame containing a check page, which is refreshed e.g. every fifth second from the management server.

Each time the check page is to be refreshed from the management server, the management server can check if the payment has arrived and either send, as a response, another check page (which will cause the browser to request the check again after the delay) or redirect the user to the service provider by including the token in the redirecting message.

The validation token included in this redirection contains the information about the user's right to the service, such as information about the payment of the requested service.

The automatic reloading of the check page can be implemented with e.g. JavaScript embedded on the page, a Refresh HTTP protocol header or a Refresh meta tag within the page data.

An incomplete page can be sent to the user terminal so that the beginning of the page is displayed along with the instructions, whereafter the connection is kept open and after the payment has arrived, the end of the same page is sent with the redirection and token information. The connection between the user's browser and the management server can be closed.

A client-side program (e.g. Java applet, ActiveX component) is sent to the browser along the instruction page. This program runs on the user's browser, connects to the management server and when payment arrives, the management server sends the redirection and token to the program which then makes the browser redirect to the content with the token.

This is not an exhaustive list of the available solutions, and also other alternatives to keep the connection open exist.

In the most preferable embodiment all users, including the users having the right to the service, are redirected to the management server for obtaining a validation token after having requested the service.

Thus, users having the right to the service have a valid payment status, which is checked and confirmed by the management server. The management server generates a validation token and sends it in the redirection massage, when the user is redirected to the service provider having obtained the right to the service. In this case, the validation token is a short expire token for all users with a short life time of e.g. one or a few minutes to avoid misuse of valid tokens by unauthorized users.

The invention, however, also covers embodiments, in which the validation token is a subscription token or a long time token. In that case, this long time token can be included in the first request already and no redirection steps are needed.

The invention is very advantageous in view of prior art, since in prior art solutions, it is the service provider that maintains the registers of user accounts requiring complex software in the service providers to handle management of users and payments. Even if there would be components keeping user information, in prior art solutions the service providers have to be in contact with the management server, which is not the case in the invention, wherein the service provider just checks the validation token and then delivers the service if this validation token is valid.

In the following, the invention is described by means of figures for illustrating the invention. The intention is not to restrict the invention to the details of the figures or accompanying text.

FIGURES

DETAILED DESCRIPTION

Figure 1:
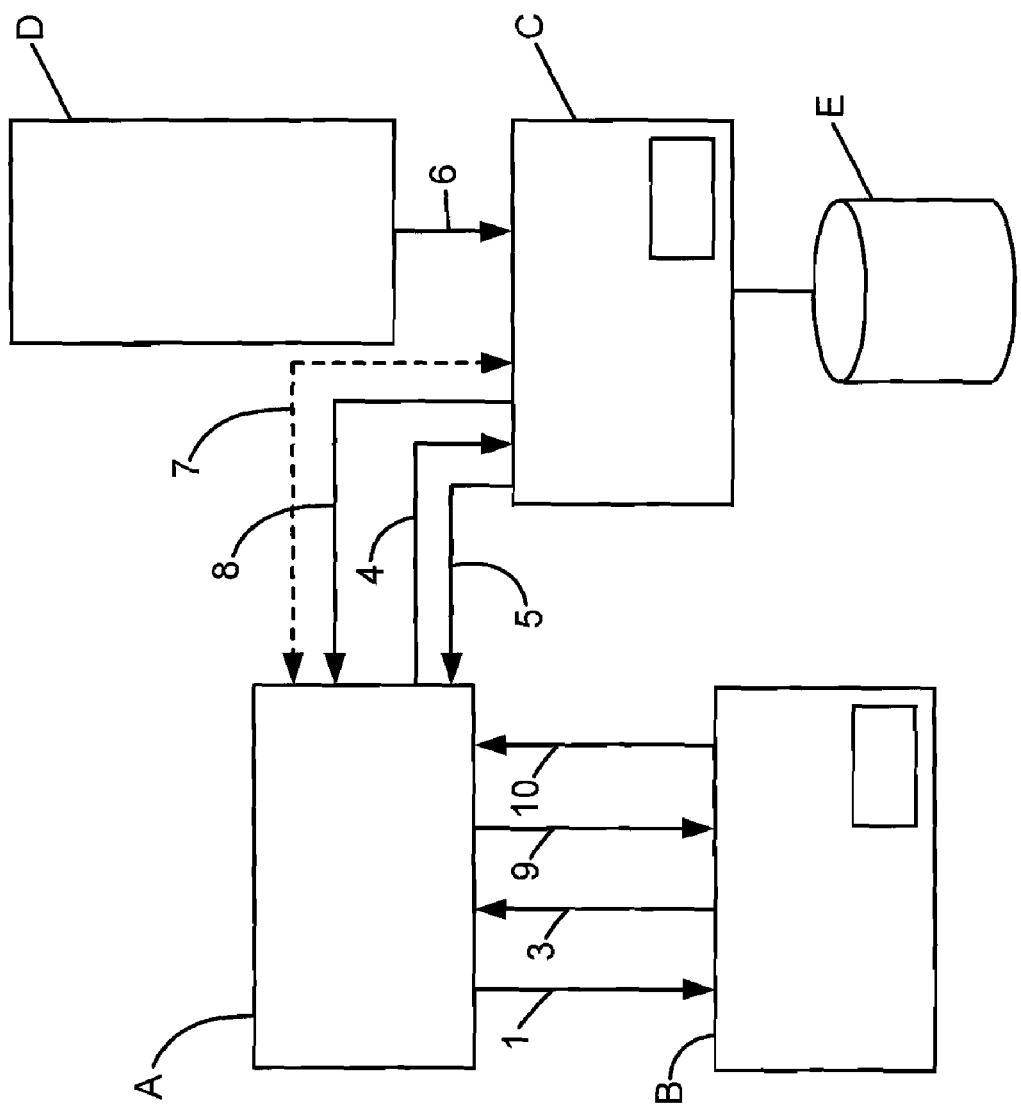
FIG. 1 illustrates the network and the method used in the invention.

The network presented in FIG. 1 contains a browser terminal A of the user, a service provider B, a management server C and a mobile terminal D.

Services can be requested with the browser A from the service provider B. The service provider B provides services to the user terminal A in form of e.g. web pages. The management server C manages a data base E with information of valid users and communicates with service users in order to get payments for services to be used.

The using of services provided by the service provider B starts by a request to use the services.

Thus, in the example of FIG. 1, the user terminal A sends a request for a service to the service provider B in step 1, by e.g. writing the address to the requested web page, such as a URL address.

Figure 2:
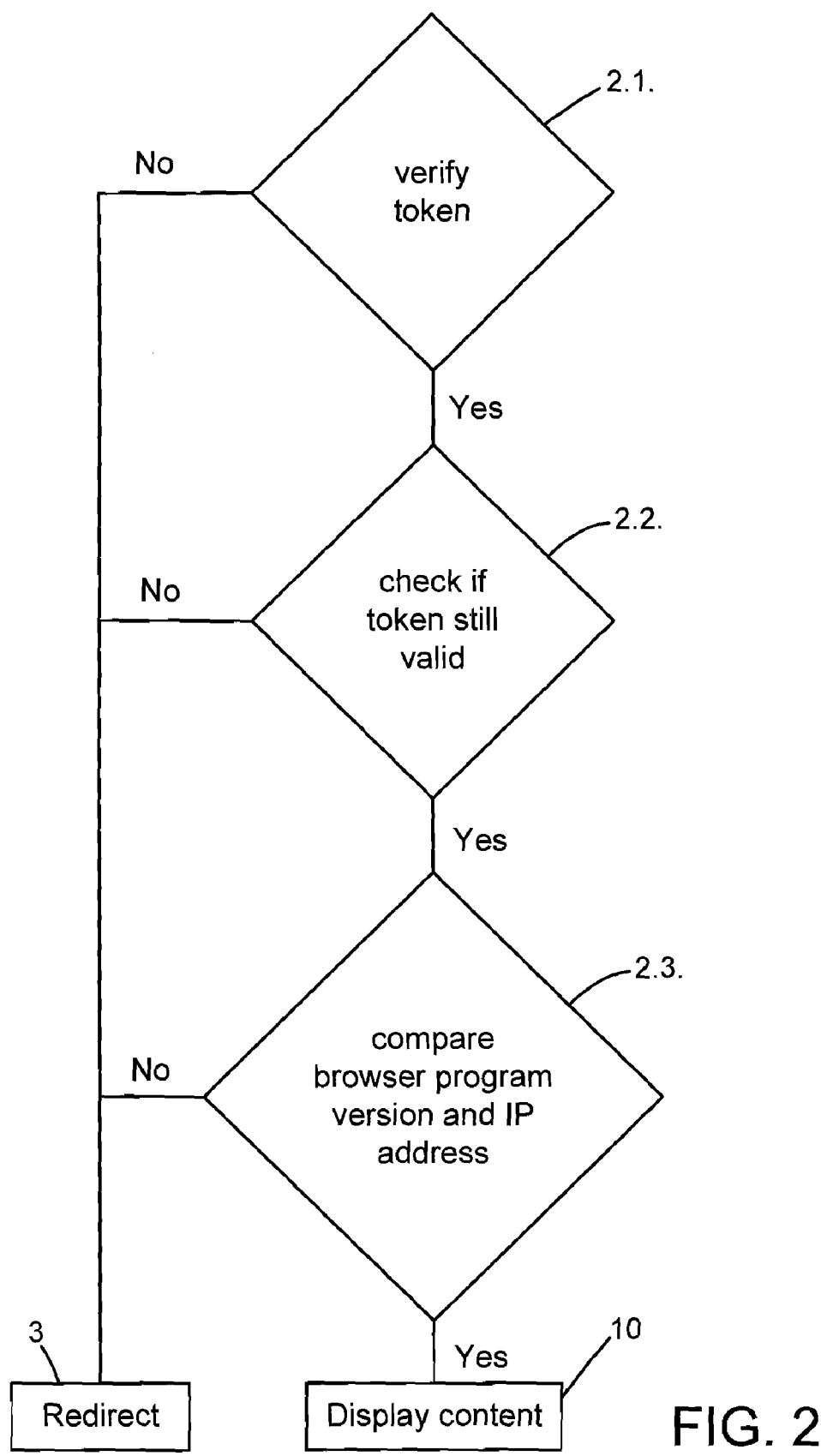
FIG. 2 is a more detailed description of step 2 in FIG. 1.

In step 2, as detailed in FIG. 2, the service provider B, which can be an internet server, checks the validation of the user's access to the service. If the user has access to the service, there is a validation token included in the request given earlier to the user by the management server C. If the user now requests this service for the first time as a new user, there is no token sent along with the request.

The token is a validation given to the user and includes e.g. a validation time for the right of the user to access the service, and information about that payment has been performed by the user for this service. The service provider can connect the payment information to the right service by means of content ID referring to this service.

In the most preferable embodiment, the token is a short expire token, that is valid only for e.g. one or a few minutes and is given to the user in step 8. With such a solution it is avoided that the token is used by other users which e.g. the user might have given the token to. In this embodiment of the invention, there is never any token in the request of step 1 and the check made by the service provider in step 2 always fails. In another embodiment, in case of a long time token, such as a subscription token, there might be a token sent already in step 1. It is, however, preferable that the token always is given by the management server in step 8 as a one-time token and there is no token in step 1 yet even if the payment itself is a long time payment or a subscription.

If in step 2, the token tells that payment is valid, the next step is step 10, whereby the content requested is displayed to the user A.

But if there is no validation token in the request of step 1, which is the case in the preferable embodiments of the invention, the user is redirected to the management server automatically. For example, the HTTP protocol supports redirecting. In that technique, return data is sent with instructions to the browser to search a new address, in this case the URL address of the management server C. The browser performs this redirection then automatically and the user is not usually aware of this redirecting. This is illustrated by steps 3 and 4 in FIG. 1. In step 3, the service provider also informs a content ID to be used in connection with this requested service so that the service provider can identify the service later.

In step 4, the content ID for the service requested is informed to the management server C. Step 4 can be seen as a request to the management server C. In step 4, also user information in a cookie is sent to the management server C if the user has a cookie and is not a new user.

As a result of step 4, the management server C checks in a database E information of the user and updates the user cookie if necessary or creates a user cookie if the user is new and stores it in the database.

In step 5, the management server C sends instructions to the user terminal A in order to get payment for the service requested.

In the instructions of step 5, the management server requests the user to pay the service and tells how. The message can for example be in the form "pay 3429 to number 6666". Thus, the message contains a unique code (here 3429) that binds the user to this particular service (to a particular content ID). This content ID was given earlier by the service provider in step 3. In the method of the invention, all users get their own codes, which bind them to the service intended to be used. When the user follows the instructions, the payment can for example be performed with a mobile phone D with a SMS message to a certain number according to the instructions or by calling to a given number.

The message of step 5 also includes a cookie for the user to be used the next time when the user requests a service. The cookie contains user information, i.e. usually only the name of the user. The message of step 5 can e.g. be sent in the form of an incomplete web page, which is completed when the user has performed the payment.

After that the payment has been made, i.e. the sending of the SMS message to a given number is performed, information of this is sent to the management server C. The operator of the network, such as the GSM-network, to which the mobile phone belongs, can e.g. forward this information. All this is illustrated by arrow 6 in FIG. 1.

So, when the payment has been done the management server C gets the information of it and redirects the user to the service provider in steps 8 and 9. In the redirecting, the management server C sends a token with the message in step 8, the token including information to the service provider of a valid payment for this service, informing also the content ID so that the service provider would be able to connect the payment with the actual service and the actual user.

In step 8, also a cookie for the user (to be used in step 4 the next time) is sent. When the user next time requests the service, the management server C can recognise him by means of the cookie. During steps 4-8, the connection is open (for a certain time) between the user A and the management server C, waiting for the payment to be done. This is illustrated by double arrow 7 in FIG. 1.

When step 9 is performed, the service provider B performs the same check as in step 2 again and if the check now shows that the validation token is ok, the content of the paid service is delivered in step 10.

FIG. 2 is a more detailed description about how the check in step 2 is performed in the service provider. If there is no token in the request of the user (step 1), the user is redirected directly to the management server C. But if there is a token in the request, the check of the token is made in three phases in this example. First, in step 2.1. the integrity of the validation token is checked in order to confirm that no changes have been made in the token after that the management server C sent it to the user. Different technologies can be used to check the integrity. E.g. the token's crypto signature can be checked. In practise, this means that the token is checked by means of a shared secret checksum algorithm, such as MD5, to check that the user has not made changes in the token and that the token really is the one sent by the management server C. If this check fails, the service provider is continuing with step 3 already described.

The token also has a certain lifetime after which it is not more valid. If the check of 2.1. was passed, then the next check in this example is to check if the token is still valid. This is made both for subscription token or longer time tokens and short expire tokens. If the result of step 2.2. is no, then also in this case the service provider is continuing with step 3 already described. If the check of 2.2. was passed then the service provider in step 2.3. compares the browser program e.g. by means of string prefix/pattern and the IP address with those of the user that had made the payment to avoid that another user would try to use the service from another computer. It is e.g. noted after step 4 what browser program version the user used (such as internet explorer or different versions of netscape) and what IP address the user had etc.

If this check failed then the service provider is again continuing with step 3 already described. If the check of 2.3. was passed then the service provider continues with step 10 by displaying the content required.

The invention also covers embodiments, wherein only one or two of the above checks are performed or wherein the check is performed in another way.

Figure 3:
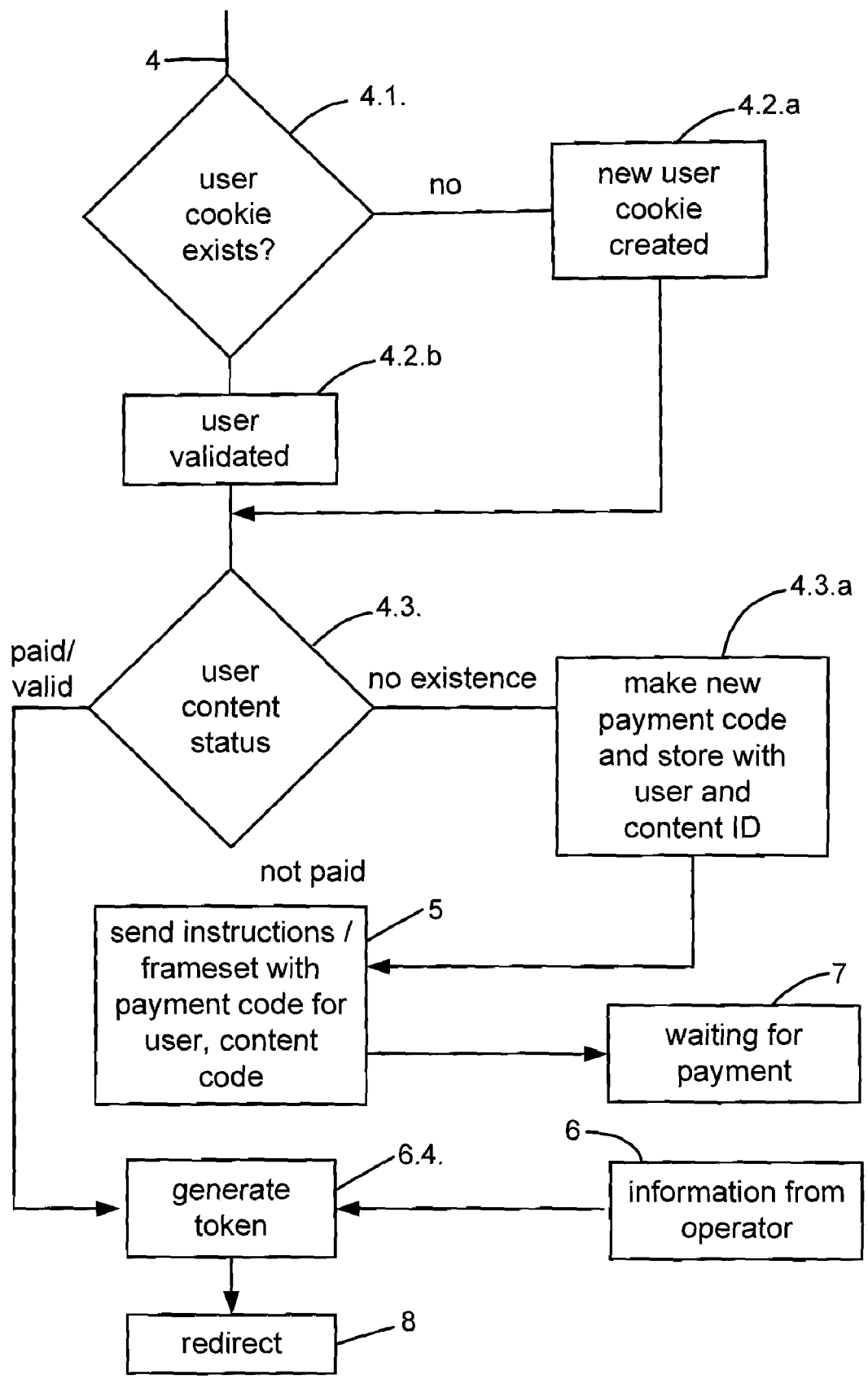
FIG. 3 is a more detailed description of step 4 in FIG. 1.

FIG. 3 is a detailed description of step 4 in FIG. 1. When the request from the browser A for paying for the service arrives in step 4 to the management server C the first thing is to check in step 4.1. if the user already exists in the database, i.e. if there is a cookie for the user in the database E.

If the user is a new user then a new user cookie is created in step 4.2.*a* and this cookie together with the instructions in step 8 is sent to the browser. If there is an earlier user cookie then this user is validated as a user in step 4.2.*b* if the request comes from the same IP address as earlier or the same browser program. In step 4.3., the content status of the user is checked, i.e. if the user has paid for the content ID requested. Here it has to be noted that in the preferred embodiments of the invention, the user is always redirected to the management server after step 1 even if there might be a valid payment. Therefor the content status check in step 4.3. has to be made. If there is no content status to check then a new unique payment code to this user is created and this is stored with the user information and the content ID as a unique code. If such a user content status information exists and is paid, then a token is generated and the management server C continues with steps 8 and 9 by redirecting the user to the service provider. If the user content status exists but is not paid then instructions is sent to the user in step 5 for the user and information how to pay for the service. Also after step 4.3.*a*, step 5 is the next step.

After that the instructions have been sent to the user in step 5, the session waits for the payment in step 7 and keeps the connection between the parties open a certain time. When information about the payment, from e.g. an operator, has reached the management server C in step 6, a token is generated in step 6.4. to be sent with the message in step 8 telling that the service is now paid. The incomplete web page sent in step 5, can now be completed, which is done in step 8.

Figure 4:
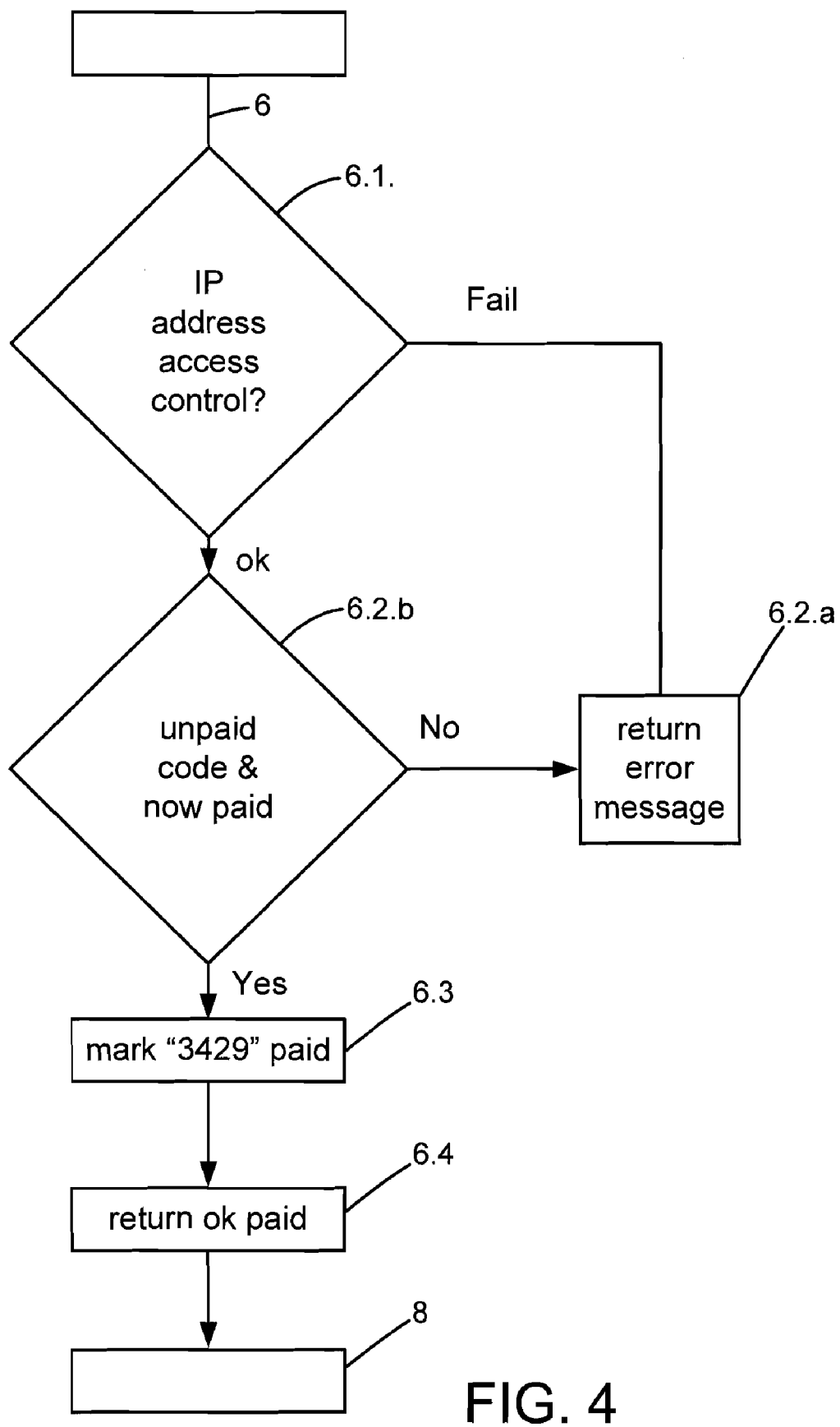
FIG. 4 is a more detailed description of step 6 in FIG. 1.

FIG. 4 describes in more detail how the payment is noted in the method of the invention. When the message sent from the mobile phone in step 6 in order to pay for the service arrives to the operator of the network the mobile phone belongs to, a message informing about that is sent from the operator to the management server. An IP address access control is then performed by the management server C in step 6.1 to check from where the message comes.

If this check fails then a return error message is created in step 6.2.*a* but if this check passes then the unpaid code is checked in step 6.2.*b*. If the right unique code has not been paid a return error message is created in step 6.2.*a*. If the code now is paid, then it is marked in the data base in 6.3. and it is informed in 6.4. that the service has been paid by means of a token and the user can be redirected to the service in point 8.

The invention claimed is:

1. A method for delivering and charging for services in a telecommunication network, having at least one user terminal, a browser, a service provider and a management server, the method comprising:

the user terminal of a user sending a request for a service to the service provider, the service provider checking at the service provider if the user has the right to the requested service, when the user does not have the right to the requested service:

the service provider sending a redirect signal to the user terminal to redirect the user to the management server, the redirect signal including a content identification associated with the requested service;

the user terminal sending a service request to the management server, the service request sent to the management server comprising the content identification;

the management server receiving the service request, including the content identification, from the user terminal;

the management server sending a payment request based on the content identification for the service request to the user terminal, the payment request comprising a unique code;

the user making a payment according to the payment request by sending a payment confirmation signal to a service number operated by a payment recipient;

the payment recipient then sending a payment confirmation signal to the management server to confirm payment, the payment confirmation signal including the unique code;

the management server receiving the payment confirmation signal and the unique code;

the management server sending a redirect signal to the user terminal to redirect the user terminal to the service provider, the redirect signal from the management server including a token based on the unique code to confirm payment of the requested service;

the user terminal receiving the redirect signal from the management server;

a browser of the user terminal automatically sending a new service request, comprising the token, to the service provider to again request the service;

the service provider receiving the new service request; and after receiving the new service request, the service provider again checking whether the user has the right to the requested service based on the token; and delivering the requested service to the user terminal after having confirmed the user's right to the service.

2. The method of claim 1 wherein the request for the service from the user terminal to the service provider is a web page and the request contains an address to the web page.

3. The method of claim 1 wherein the management server checks if a payment for the requested service has been performed.

4. The method of claim 1 wherein the service provider checks the right to the service and validating the token included in the service request from the user terminal when the user has the right to the service.

5. The method of claim 4 wherein the method further comprises the steps of checking an integrity of the token, a validation time, a browser program and/or IP address.

6. The method of claim 1, wherein the method further comprises the browser sending a cookie to the management server and the cookie containing user information.

7. The method of claim 6 wherein information about valid users is stored in a database and includes a list of cookies of valid users and other user information including validity times for using the service, user equipment information, and connection information to avoid misuse of the right to use the service.

8. The method of claim 7 wherein the management server updates the cookies in the database or creates a new cookie for a new user.

9. The method of claim 1 wherein the instructions from the management server to the user terminal also includes a user cookie to be used next time a service is requested.

10. The method of claim 3 wherein the payment is a one-time payment or a subscription.

11. The method of claim 1 wherein a connection between the service provider and the user terminal is kept active by the management server sending instructions in a form of an incomplete web page, which is completed when the user has paid for the requested service.

12. The method of claim 1 wherein a connection between the service provider and the user terminal is kept active by the management server sending instructions in a form of a frame-set, containing one frame having a page with instructions for paying and another frame containing a check page.

13. The method of claim 12 wherein the check page is refreshed with short intervals.

14. The method of claim 12 wherein when the payment for the service has been performed, another check page is formed, which causes the user browser to request the check again.

15. The method of claim 1 wherein a connection between the service provider and the user terminal is kept active by sending a program to the browser with an instruction page, the program connecting the browser to the management server and when the payment arrives, the management server sends a redirection message and a validation token to the program, which causes the browser to redirect to the service provider.

16. The method of claim 1 wherein when the payment for the service has been performed, a the token included in the redirect signal contains information about the user's right to the requested service including information about payment of the requested service.

17. The method of claim 16 wherein the token is a short expire token with a short lifetime.

18. The method of claim 16 wherein the token is a subscription token or a long time token.

19. The method of claim 1 wherein users having the right to the service have a valid payment status.

20. The method of claim 16 wherein the token is a short expire token for all users.

* * * * *